US011789777B2

(12) United States Patent
Chen et al.

(10) Patent No.: US 11,789,777 B2
(45) Date of Patent: Oct. 17, 2023

(54) RESOURCE UTILIZATION METHOD, ELECTRONIC DEVICE, AND COMPUTER PROGRAM PRODUCT

(71) Applicant: EMC IP Holding Company LLC, Hopkinton, MA (US)

(72) Inventors: Tao Chen, Beijing (CN); Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 359 days.

(21) Appl. No.: 17/077,434

(22) Filed: Oct. 22, 2020

(65) Prior Publication Data

US 2022/0091888 A1 Mar. 24, 2022

(30) Foreign Application Priority Data

Sep. 18, 2020 (CN) ........................ 202010987912.8

(51) Int. Cl.
*G06F 9/46* (2006.01)
*G06F 9/50* (2006.01)
(Continued)

(52) U.S. Cl.
CPC .......... *G06F 9/5011* (2013.01); *G06F 3/0604* (2013.01); *G06F 3/067* (2013.01);
(Continued)

(58) Field of Classification Search
CPC .... G06F 9/5011; G06F 9/4881; G06F 3/0604; G06F 3/0613; G06F 3/0631; G06F 3/067;
(Continued)

(56) References Cited

U.S. PATENT DOCUMENTS

| | | | | |
|---|---|---|---|---|
| 10,585,718 | B2 * | 3/2020 | Sardino | G06F 9/5044 |
| 11,290,392 | B2 * | 3/2022 | Sen | H04L 47/803 |
| 2020/0026575 | A1 * | 1/2020 | Guim Bernat | H04L 9/0827 |

FOREIGN PATENT DOCUMENTS

| | | | | |
|---|---|---|---|---|
| CN | 106681793 A | * 5/2017 | | G06F 9/45558 |
| CN | 110493360 A | * 11/2019 | | H04L 67/1008 |
| JP | 2020110926 A | * 7/2020 | | |

* cited by examiner

*Primary Examiner* — Diem K Cao
(74) *Attorney, Agent, or Firm* — WOMBLE BOND DICKINSON (US) LLP

(57) ABSTRACT

Embodiments of the present disclosure provide a resource utilization method, an electronic device, and a computer program product. A resource utilization method comprises: at a first node of a storage system, determining whether a local processing delay of a first accelerator resource of the first node exceeds a first threshold delay or not; if it is determined that the local processing delay exceeds the first threshold delay, determining at least one remote processing delay respectively corresponding to at least one second node of the storage system, wherein each remote processing delay comprises a processing delay of a second accelerator resource of a corresponding second node and a round-trip time between the first node and the corresponding second node; and at least based on the at least one remote processing delay, selecting a second accelerator resource, from the second accelerator resources of the at least one second node, to execute a target job of the first node. In this way, the calling of the accelerator resources across nodes may be implemented, thereby not only improving the processing efficiency of the jobs but also increasing the overall utilization rate of system resources.

20 Claims, 5 Drawing Sheets

(51) Int. Cl.
*G06F 9/48* (2006.01)
*G06F 11/07* (2006.01)
*G06F 3/06* (2006.01)

(52) U.S. Cl.
CPC .......... *G06F 3/0613* (2013.01); *G06F 3/0631* (2013.01); *G06F 9/4881* (2013.01); *G06F 11/0757* (2013.01); *G06F 2209/508* (2013.01); *G06F 2209/5022* (2013.01)

(58) Field of Classification Search
CPC ......... G06F 11/0757; G06F 2209/5022; G06F 2209/508
See application file for complete search history.

RESOURCE UTILIZATION METHOD, ELECTRONIC DEVICE, AND COMPUTER PROGRAM PRODUCT

CROSS-REFERENCE TO RELATED APPLICATION

This patent application claims the priority, under 35 U.S.C. § 119, of Chinese Patent Application No. 202010987912.8, filed Sep. 18, 2020, which is incorporated by reference in its entirety.

TECHNICAL FIELD

Embodiments of the present disclosure relate to the technical field of computers, and in particular to a resource utilization method, an electronic device, and a computer program product.

BACKGROUND

Accelerator resources refer to some processing resources with an acceleration function, such as a co-processor, which can assist a central processing unit (CPU) to perform some acceleration tasks. The co-processor is a chip that can alleviate specific processing tasks of a system CPU. For example, a math co-processor may perform digital processing, and a graphics processing unit (GPU) may process video rendering. GPU is a core processor dedicated to graphics or images, and its main task is to speed up graphics processing.

A quick assist technology (QAT) card is also a co-processor, which may be used to accelerate computationally intensive tasks, such as compression, encryption, and decryption. By adding the QAT card to a node, the computation of the node can be accelerated, and the performance and efficiency of the system can be improved.

SUMMARY

Embodiments of the present disclosure provide a resource utilization solution.

In a first aspect of the present disclosure, a resource utilization method is provided. The method comprises: at a first node of a storage system, determining whether a local processing delay of a first accelerator resource of the first node exceeds a first threshold delay or not; if it is determined that the local processing delay exceeds the first threshold delay, determining at least one remote processing delay respectively corresponding to at least one second node of the storage system, wherein each remote processing delay comprises a processing delay of a second accelerator resource of a corresponding second node and a round-trip time between the first node and the corresponding second node; and at least based on the at least one remote processing delay, selecting a second accelerator resource, from the second accelerator resources of the at least one second node, to execute a target job of the first node.

In a second aspect of the present disclosure, an electronic device is provided. The electronic device comprises a processor and a memory coupled with the processor. The memory has instructions stored therein. When executed by the processor, the instructions cause the device to execute actions. The actions comprise: at a first node of a storage system, determining whether a local processing delay of a first accelerator resource of the first node exceeds a first threshold delay or not; if it is determined that the local processing delay exceeds the first threshold delay, determining at least one remote processing delay respectively corresponding to at least one second node of the storage system, wherein each remote processing delay comprises a processing delay of a second accelerator resource of a corresponding second node and a round-trip time between the first node and the corresponding second node; and at least based on the at least one remote processing delay, selecting a second accelerator resource, from the second accelerator resources of the at least one second node, to execute a target job of the first node.

In a third aspect of the present disclosure, a computer program product is provided, which is tangibly stored on a computer-readable medium and comprises computer-executable instructions. When executed, the computer-executable instructions cause the device to: at a first node of a storage system, determine whether a local processing delay of a first accelerator resource of the first node exceeds a first threshold delay or not; if it is determined that the local processing delay exceeds the first threshold delay, determine at least one remote processing delay respectively corresponding to at least one second node of the storage system, wherein each remote processing delay comprises a processing delay of a second accelerator resource of a corresponding second node and a round-trip time between the first node and the corresponding second node; and at least based on the at least one remote processing delay, select a second accelerator resource, from the second accelerator resource of the at least one second node, to execute a target job of the first node.

The Summary part is provided to introduce the selection of concepts in a simplified form, which will be further described in the detailed description below. The Summary part is neither intended to identify key features or main features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

DETAILED DESCRIPTION

The principles of the present disclosure will be described below with reference to some example embodiments shown in the accompanying drawings. Although preferred embodiments of the present disclosure are shown in the accompanying drawings, it should be understood that these embodiments are described merely to enable those skilled in the art to better understand and then implement the present disclosure, and do not limit the scope of the present disclosure in any way.

The term "include" and variants thereof used herein indicate open-ended inclusion, that is, "including but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Figure 1:
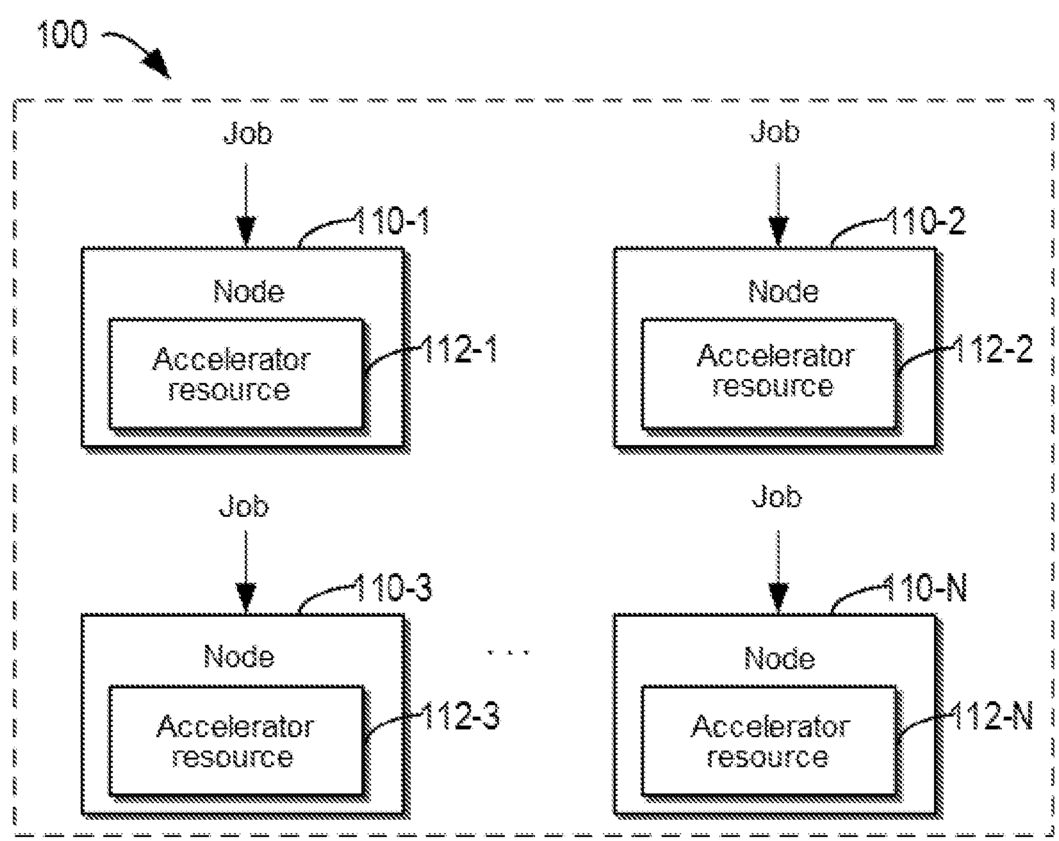
FIG. 1 shows a schematic block diagram of a storage system in which an embodiment of the present disclosure can be implemented.

FIG. 1 shows a schematic diagram of storage system 100 in which an embodiment of the present disclosure may be implemented. Storage system 100 is used to provide tasks related to data storage including, such as storage, data access, and data protection (for example, deduplication, backup, encryption, decryption, etc.). Therefore, storage system 100 is sometimes also referred to as a data protection system or a deduplication system (because deduplication is one of the important functions in data protection). It should be understood that the system shown in FIG. 1 is only an example. In an actual application, more other devices and/or components in devices may exist in the storage system, or the devices and/or components shown may be arranged in other manners.

As shown in FIG. 1, storage system 100 comprises a plurality of (e.g., N) nodes 110-1, 110-2, 110-3, . . . , 110-N, where N is an integer greater than 1. For ease of discussion, nodes 110-1, 110-2, 110-3, . . . , 110-N are sometimes referred to, collectively or individually, as nodes 110 hereinafter. Each node 110 is configured to execute various jobs of storage system 100.

In storage system 100, jobs to be executed at nodes 110 include various types of jobs related to data storage. As some examples, the jobs may include data backup jobs for executing backups of user data; data recovery jobs for restoring damaged user data; and garbage collection jobs for collecting storage space that is no longer occupied in storage system 100. Of course, these are just some specific examples. There may be other types of jobs in storage system 100.

Nodes 110 may be implemented by one or more computing devices, computing systems, servers, mainframes, edge devices, etc. Each node 110 is deployed with corresponding resources, including processing resources, storage resources, network resources, etc., for executing corresponding jobs. Generally, besides universal processing devices (not shown), each node 110 also includes accelerator resources that may be deployed. As shown in FIG. 1, node 110-1 includes accelerator resource 112-1, node 110-2 includes accelerator resource 112-2, node 110-3 includes accelerator resource 112-3, . . . , node 110-N includes accelerator resource 112-N. Hereinafter, for ease of discussion, accelerator resources 112-1, 112-2, 112-3, . . . , 112-N are sometimes, collectively or individually, referred to as accelerator resources 112.

The utilization of accelerator resources 112 may improve the processing performance of each node 112 so as to increase the overall throughput of the node. In some embodiments, accelerator resources 112 may be one or more QAT cards. It should be understood that although the QAT cards are used as an example of the accelerator resources in some embodiments of the present disclosure, accelerator resources 112 may also comprise other hardware processing devices having an acceleration function.

Depending on the storage system used, in some embodiments, storage system 100 may comprise two nodes (i.e., N=2) 110. Such a system is called an active-passive High Availability (HA) system. In such a system, one node 110 is configured as an active node, and the other node 110 is configured as an inactive node or a standby node. Generally, various operations of storage system 100 are executed by the active node. The inactive node is a mirror image of the active node. When a disaster occurs on the active node, the inactive node is started to replace the active node.

In some embodiments, storage system 100 may include a scalable multi-node system comprising at least two (i.e., N>2) nodes 110. In such a system, jobs may be scheduled to each node 110 for execution. Every node 110 may be deployed with the same or different accelerator resources 112 for executing corresponding jobs.

As mentioned above, deploying the accelerator resources in each node of the storage system may improve the processing performance. However, there may be insufficient accelerator resources during job execution. For example, in an active-inactive HA system, the processing pressure is concentrated on the active nodes, and the accelerator resources of the inactive nodes are idle most of the time. In a scalable multi-node system, although jobs may be distributed across nodes, uneven distribution may still exist, which results in some nodes needing to execute more jobs and causing greater processing delays.

When facing the problem of insufficient accelerator resources, a simple solution is to upgrade the processing capability of each node by deploying more accelerator resources. However, this will increase the overhead. There are some job scheduling solutions in the current storage system, but these solutions mainly focus on how to adaptively schedule universal processing resources and accelerator resources of nodes within a single node. Such a solution cannot solve the problem of insufficient accelerator resources from a global perspective of the overall system.

According to an embodiment of the present disclosure, a resource utilization solution is proposed. According to the solution, when a node determines that the processing delay of a local accelerator resource is too large, the remote processing delay of one or more other nodes in the system may be determined, and the accelerator resources of other nodes may be selected for executing jobs based on the remote processing delay. When determining whether to use the accelerator resources of other nodes or not, the remote processing delay of the other nodes includes not only the processing delay of the accelerator resource of the node, but also the round-trip time across nodes.

In this way, the calling of accelerator resources across nodes may be implemented, thereby not only improving the processing efficiency of the jobs but also increasing the overall utilization rate of system resources.

Fundamental principles and some example embodiments of the present disclosure are described below with reference to the accompanying drawings.

Figure 2:
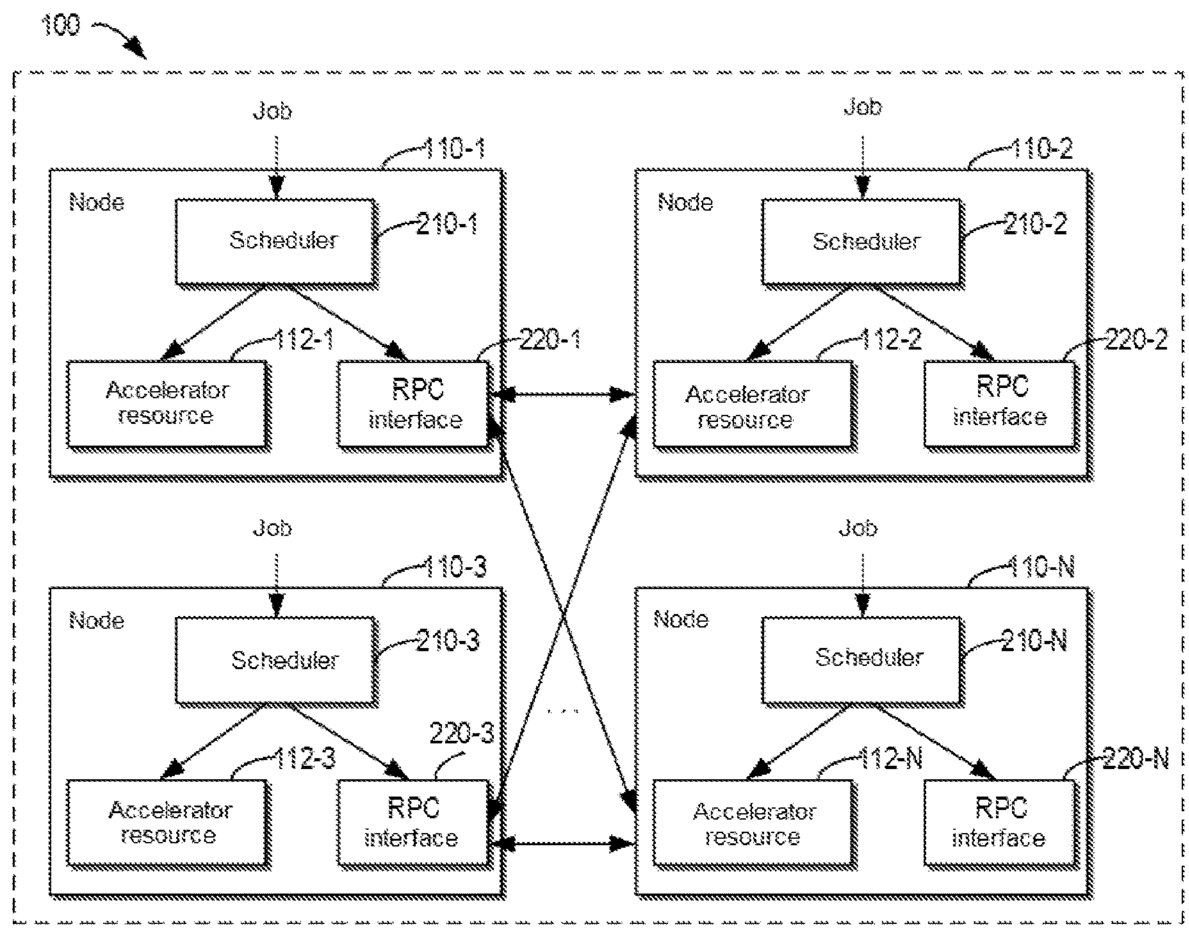
FIG. 2 shows a schematic block diagram of an example storage system according to some embodiments of the present disclosure.

FIG. 2 shows a schematic block diagram of an example storage system according to some embodiments of the present disclosure. For ease of discussion, on the basis of the example storage system 100 in FIG. 1, the discussion continues on how to implement the utilization of accelerator resources according to the embodiments of the present disclosure. In order to implement the calling of accelerator resource across nodes, as shown in FIG. 2, each node 110 of storage system 100 is deployed with a scheduler 210-1, 210-2, 210-3, . . . , or 210-N and a remote procedure call (RPC) interface 220-1, 220-2, 220-3, . . . , or 220-N.

Hereinafter, for ease of discussion, schedulers 210-1, 210-2, 210-3, . . . , 210-N are sometimes referred to, collectively or individually, as schedulers 210, and RPC interfaces 220-1, 220-2, 220-3 . . . , 220-N are sometimes referred to, collectively or individually, as RPC interfaces 220.

Schedulers 210 at nodes 110 are configured to execute scheduling of the jobs to be executed at nodes 110. When scheduling the job execution, according to the embodiments of the present disclosure, schedulers 210 are configured to determine to schedule local accelerator resources 112 or remote accelerator resources 112 to execute the jobs. RPC interfaces 220 in nodes 110 are configured to implement data access between nodes 110 when it is determined to utilize the remote accelerator resources. The function of RPC interfaces 220 will be discussed in detail hereinafter.

In the present disclosure, "local accelerator resources" 112 refer to, with respect to the current nodes 110, the accelerator resources deployed in the nodes 110, and "remote accelerator resources" 112 refer to, with respect to the current nodes 110, the accelerator resources deployed in other nodes 110. For example, for node 110-1, the accelerator resource 112-1 is a local accelerator resource, while accelerator resources 112-2, 112-3, . . . , 112-N, etc. are remote accelerator resources.

Through research, the inventor found that it is feasible to utilize the remote accelerator resources to balance the local processing pressure, because the data transmission rate between the nodes may be faster in implementation, thereby reducing the network transmission delay between nodes. In the deployment of common accelerator resources in some nodes, if the system is busy, there are many jobs that need to be processed. For example, for a unit of data of 128 KB, the processing delay thereof may reach 1500 μs. However, between the nodes connected based on the high-speed network interface such as a remote direct memory access (RDMA), the round-trip time for transmitting a unit of data may be between 355 μs and 135 μs. That is to say, compared with the higher processing delay of the accelerator resources, the network transmission delay between the nodes may not have a great impact on the overall processing delay of the job. Based on such research findings, the inventor proposes to increase the job processing rate by calling the accelerator resources across nodes in local nodes, thereby improving the overall resource utilization.

In some embodiments, in storage system 100, nodes 110 in which the accelerator resources may be scheduled across nodes are connected through a high-speed network interface, e.g., a RDMA interface. In some examples, the RDMA interface may implement data transfer between nodes 110 through various protocols, such as a protocol of RDMA over Converged Ethernet (RoCE). Other high-speed network interfaces are also feasible. In some embodiments, in order to improve processing performance in the case of cross-node scheduling, the round-trip time between nodes 110 may be smaller than the local processing delay of a single node 110, which may be achieved by selecting an appropriate network interface.

It should be understood that although FIG. 2 shows that a scheduler 210 and a RPC interface 220 are deployed in each node 110 of storage system 100, depending on actual needs, there may be only some nodes 110 deployed with schedulers 210 and RPC interfaces 220 to realize the cross-node resource scheduling of the embodiments of the present disclosure. It should be noted that, for clarity, FIG. 2 does not show the coupling of each RPC interface 220 to all other nodes of storage system 100. For example, the coupling of RPC interface 220-1 of node 110-1 to node 110-3 is not shown. However, such coupling may exist according to actual needs.

Figure 3:
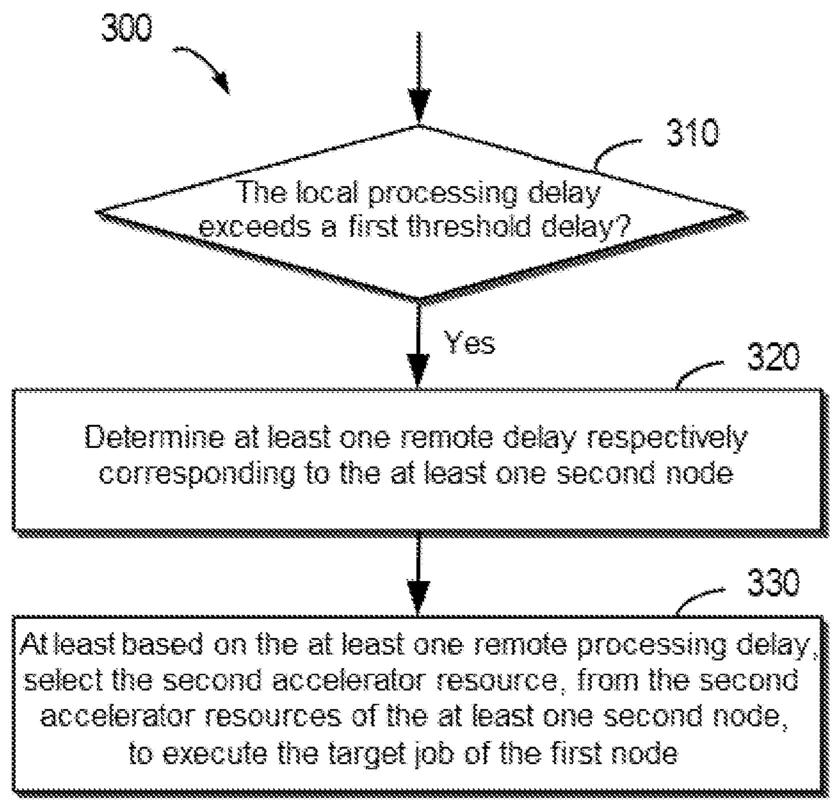
FIG. 3 shows a flowchart of a process of resource utilization according to some embodiments of the present disclosure.

The cross-node resource calling implemented at nodes 110 will be described below with reference to FIG. 3. FIG. 3 is a flowchart of process 300 of resource utilization according to some embodiments of the present disclosure. Process 300 may be implemented by nodes 110 of system 100, e.g., may be implemented by schedulers 210 of nodes 110. For ease of description, process 300 will be described with reference to FIG. 2. Hereinafter, for ease of discussion, it is assumed that process 300 is implemented at node 110-1 in storage system 100 in FIG. 2. It should be understood that any node 110 in system 100 may be configured to implement process 300 as needed.

In the text, a node 110 (e.g., node 110-1) in which process 300 is implemented is sometimes referred to as "the first node," and the accelerator resource 112 (e.g., accelerator resource 112-1) therein is sometimes referred to as "the first accelerator resource." Other nodes 110 (e.g., one or more nodes 110-2, 110-3, . . . , 110-N) or remote nodes 110 are sometimes referred to as "the second nodes," and the accelerator resources 112 therein are sometimes referred to as "the second accelerator resources." The "first" and "second" used here are only for distinguishing.

At 310, scheduler 210-1 of node 110-1 determines whether the local processing delay of accelerator resource 112-1 exceeds a threshold delay or not (for ease of description, it is referred to as the "first threshold delay"). The local processing delay refers to the delay of the nodes using the local accelerator resources to execute the jobs. The processing delay of the accelerator resources may be achieved in many ways. In some examples, the processing rate of accelerator resource 112-1 for a unit amount of data may be determined, which may be, for example, provided by the manufacturer of a accelerator resource or determined by other means. The local processing delay may be determined based on the processing rate and the data volume of the current job to be executed. In some examples, the processing delay to accelerator resource 112-1 in a past period of time may also be determined by means of statistics. Other ways to determine the processing delay are also feasible.

The first threshold delay indicates the acceptable maximum processing delay of the job to be executed at node 110-1, especially the acceptable maximum processing delay in the case of using the accelerator resources to execute the job. In some examples, the first threshold delay may be determined as the maximum processing delay acceptable to high-priority jobs, because the high-priority jobs are generally more sensitive to delay. Generally, jobs to be executed at nodes 110 may have corresponding priorities. The high priority jobs refer to jobs having the priority greater than a certain priority threshold. The first threshold delay may also be set according to needs, and there is no limitation here.

If scheduler 210-1 determines that the local processing delay of accelerator resource 112-1 exceeds the first threshold delay, it means that accelerator resource 112-1 of node 110-1 may be insufficient to quickly respond to the current job to be executed. According to the embodiments of the present disclosure, it may be considered to use the remote accelerator resources to execute the job.

Therefore, if it is determined that the local processing delay exceeds the first threshold delay, at 320, scheduler

210-1 determines at least one remote processing delay respectively corresponding to the at least one remote node 110. Other nodes 110 may include nodes that can share the accelerator resources with current node 110-1. For example, in an active-inactive HA system, for active nodes, other nodes refer to inactive nodes. In a scalable multi-node system, other nodes 110 may include all remote nodes or one or more of the remote nodes in the system.

The remote processing delay is used to indicate the overhead in terms of delay when a remote accelerator resource 112 is utilized. Different from the way of utilizing a local accelerator resource 112 to execute a job, if a remote accelerator resource 112 of another node is utilized to execute the job, the processing delay of the job may include two aspects, one of which is the processing delay of the remote accelerator resource 112 utilized, and another aspect is the network transmission delay between two nodes. The network transmission delay may be indicated by the round-trip time between two nodes. Therefore, for node 110-1, the remote processing delay corresponding to each other node 110 includes the processing delay of the remote accelerator resource and the round-trip time between two nodes.

In some embodiments, in storage system 100, each node 110 may notify other nodes of the processing delay of the node 110's own accelerator resources and the round-trip time between respective nodes. In this way, each node 110 that needs to execute the cross-node resource calling may acquire the time delay to be introduced when the node utilizes the remote accelerator resources of each other node.

Figure 4:
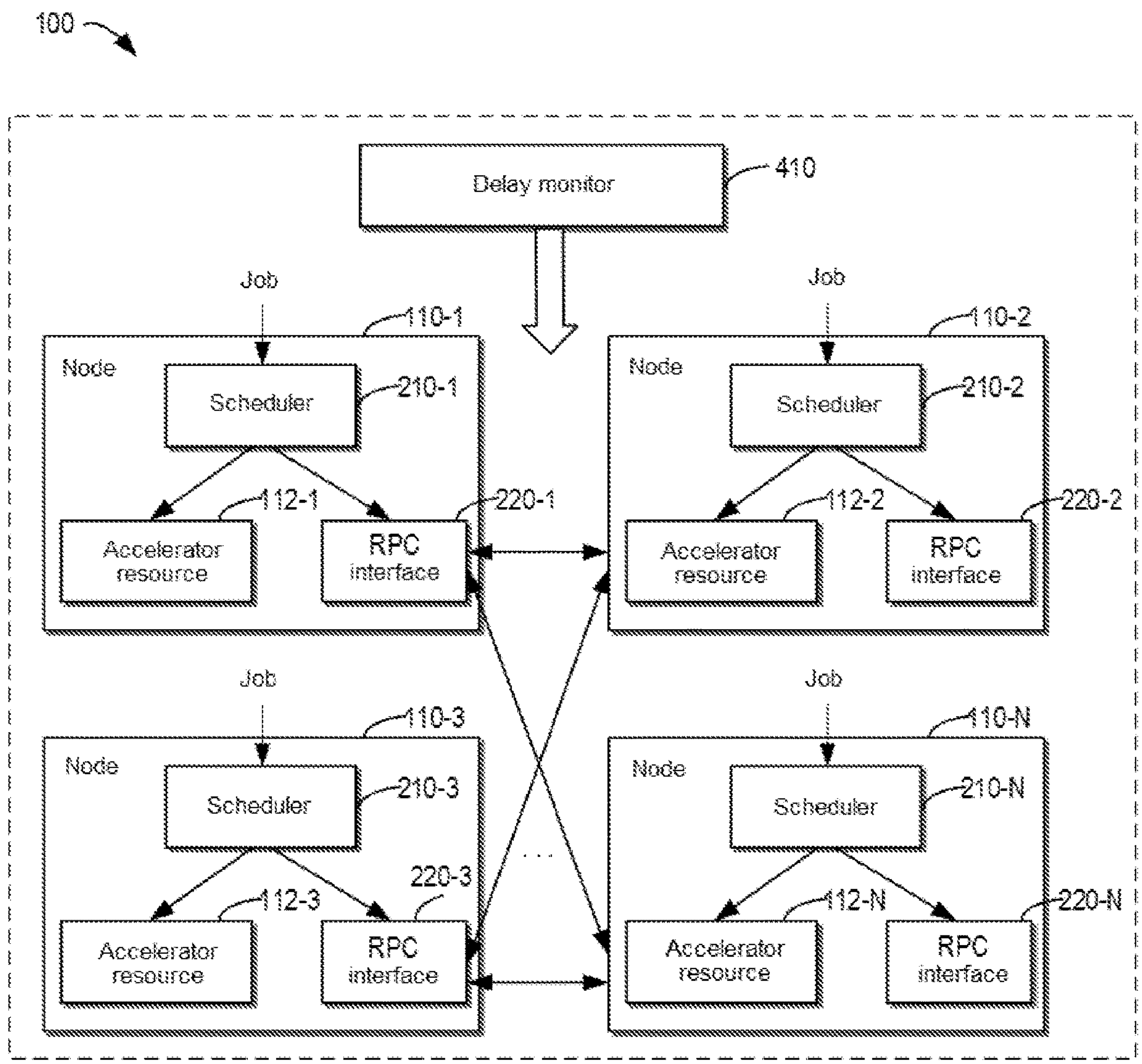
FIG. 4 shows a schematic block diagram of an example storage system according to some other embodiments of the present disclosure.

In some embodiments, a delay detector may also be arranged in storage system 100 to collect the remote processing delay of node 110 relative to other nodes 110. FIG. 4 shows such an embodiment. In the example of FIG. 4, storage system 100 comprises delay monitor 410. Node 110 is in communication with delay monitor 410 to report the processing delay of accelerator resource 112 of this node 110 and the round-trip time between this node 110 and one or more of other nodes 110 to delay monitor 410. Delay monitor 410 may report to each node 110 the remote processing delay respectively corresponding to one or more remote nodes of the node based on the collected information.

Continuing to refer to FIG. 3, after remote processing delays respectively corresponding to remote nodes 110 of node 110-1 are determined, at 330, scheduler 210-1 selects an accelerator resource 112, from accelerator resources 112 of one or more remote nodes 110, to execute the target job of node 110-1, at least based on at least one remote processing delay. The target job refers to a job, which may be scheduled to be executed by utilizing the remote accelerator resource at node 110-1. There may be one or more target jobs.

In some embodiments, when it is determined to utilize remote accelerator resource 112 to execute the target job, for an active node in the active-inactive HA system, the accelerator resource of an inactive node may be directly selected to execute the target job. In a storage system including more than two nodes, if it is determined to utilize remote accelerator resource 112 to execute the target job, scheduler 210-1 may select a remote accelerator resource in node 110 with a small remote processing delay, so as to reduce the processing time delay as much as possible.

For example, scheduler 210-1 may compare the remote processing delay respectively corresponding to the plurality of nodes 110 with a threshold delay (referred to as a "second threshold delay" for convenience). Based on a result of the comparison, scheduler 210-1 may determine the remote processing delay that does not exceed the second threshold delay from a plurality of remote processing delays, and select accelerator resource 112 of node 110 corresponding to the determined remote processing delay to execute the target job. The second threshold delay may be set as an acceptable remote processing delay of the job to be executed at node 110-1. In some examples, scheduler 210-1 may also select the lowest one or more processing delays from a plurality of remote processing delays, and select accelerator resource 112 of node 110 corresponding to the determined remote processing delay to execute the target job.

In some embodiments, if it is determined that the local processing delay of accelerator resource 112-1 of node 110-1 does not exceed the first threshold delay at 310, scheduler 210-1 selects accelerator resource 112-1 of node 110-1 to execute the current job to be executed.

Figure 5:
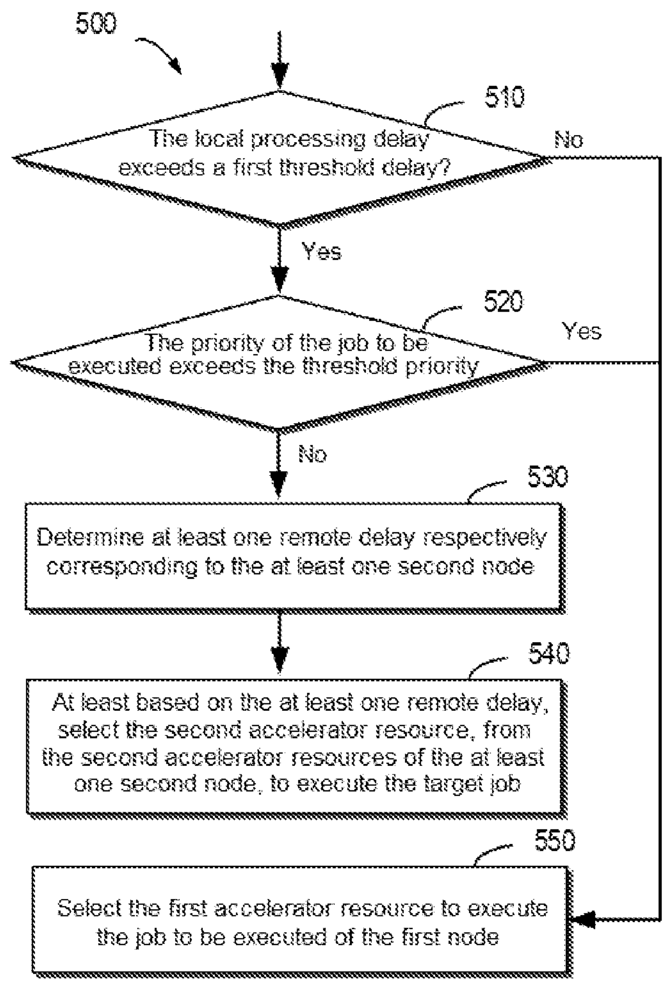
FIG. 5 is a flowchart of a process of resource utilization according to some other embodiments of the present disclosure.

In some embodiments, in addition to considering the remote processing delay, scheduler 210-1 may also determine whether the remote accelerator resource can be utilized to execute the job to be executed or not based on the priority of the job to be executed at node 110-1. FIG. 5 shows a flowchart of process 500 of resource utilization implemented at node 110-1 in an example embodiment that considers the priority of a job.

At 510, scheduler 210-1 of node 110-1 determines whether the local processing delay of accelerator resource 112-1 exceeds the first threshold delay or not, which is similar to 310 of process 300. If it is determined that the local processing delay exceeds the first threshold delay, at 520, scheduler 210-1 determines at least one remote processing delay respectively corresponding to at least one other node 110, which is similar to 520 of process 500.

At 530, scheduler 210-1 determines whether the priority of the job to be executed is greater than the threshold priority or not. The threshold priority refers to the highest priority of the job that can be scheduled to be executed by the remote accelerator resource when the local accelerator resource is insufficient. A threshold priority may be set according to actual needs.

If mentioned briefly above, the job to be executed at each node 110 has a corresponding priority. Scheduler 210-1 may utilize various prioritization classes and criteria. In some embodiments, the job priority may be related to the type of the job. For example, the priority of a data recovery job may be higher than that of a data backup job, the priority of a garbage collection job may be lower than that of a data backup job, etc. In some embodiments, the priority of a job may also be additionally or alternatively related to an application or user corresponding to the job. For example, the priority of an application or job related to a high-priority application or user may be set to a high priority. In some embodiments, the priority of a job may also be pre-configured in a request of the job. It should be understood that various other ways may also be used to distinguish priorities of respective jobs.

In some embodiments, it is desirable to reserve higher-priority jobs to be executed at local accelerator resources, so as to avoid introducing excessive processing delays caused by the execution of the high-priority jobs. Low priority jobs may be insensitive to delay, and accordingly may be scheduled to be executed at remote accelerator resources.

Therefore, in process 500, if it is determined that the priority of the job to be executed is lower than the threshold priority, scheduler 210-1 may determine the job to be executed as the job that can be executed by utilizing remote accelerator resources, that is, the aforementioned "target job." Correspondingly, scheduler 210-1 determines at least one remote processing delay respectively corresponding to the at least one remote node 110 at 530, and at least based on the at least one remote processing delay, selects an accelerator resource 112, from accelerator resources 112 of one or more remote nodes 110, to execute the target job of node 110-1, at 540, which is similar to 320 and 330 of process 300.

If it is determined that the local processing delay does not exceed the first threshold delay or the priority of the current job to be executed does not exceed the threshold priority at 510, then at 550, scheduler 220-1 will select local accelerator resource 112-1 to execute the job to be executed at node 110-1.

According to the embodiments of the present disclosure, when the accelerator resources are scheduled across nodes, the situation of the job to be executed at the local node, such as the priority of the job to be executed, is also considered. Different needs of various jobs may be met in this way, thereby ensuring that the execution of a job is aligned with service level agreement (SLA) requirements of the job.

In some embodiments, when selecting remote accelerator resources of a remote node to execute the job of local node 110, scheduler 210 may call RPC interface 220 to implement data transmission between the two nodes, so as to utilize the selected remote accelerator resource to execute the job. RPC interfaces 220 are used to dispatch data access (for example, input/output I/O access) of the jobs to be executed to remote accelerator resources 112. Such data access may be performed in an asynchronous manner.

For local node 110, during the execution of a job, transactions to be executed include sending the to-be-processed data of the job to the remote node, and acquiring the processed data from the remote node asynchronously through a callback function and the like. For remote node 110, during the execution of a job, transactions to be executed include receiving data to be processed from another node 110, utilizing accelerator resource 112 to process the received data, and returning the processed data to another node 110. It should be understood that such cross-node data transmission and reception may be implemented in various ways, and there is no specific limitation here.

Figure 6:
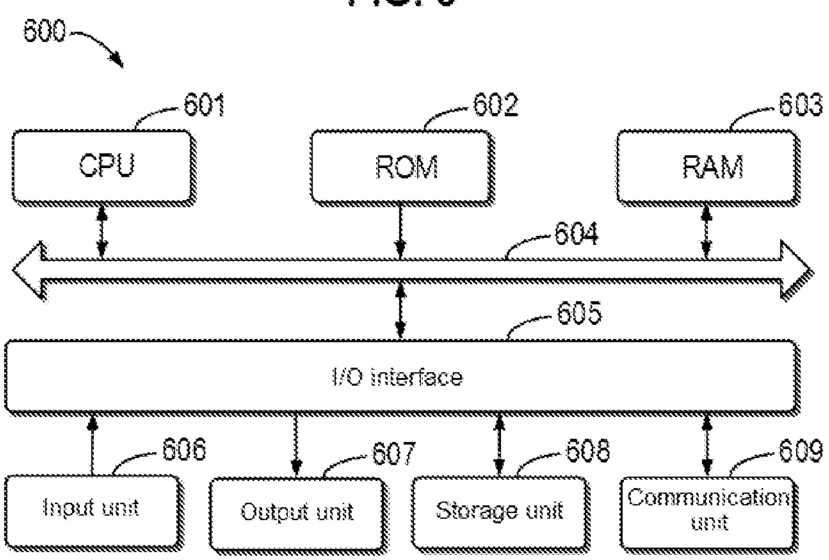
FIG. 6 is a block diagram of an example device that can be configured to implement an embodiment of the present disclosure.

FIG. 6 shows a schematic block diagram of example device 600 that may be configured to implement an embodiment of the present disclosure. Device 600 may be implemented as or included in node 110 or scheduler 210 in FIG. 2 or FIG. 4.

As shown in the figure, device 600 comprises central processing unit (CPU) 601 that can execute various appropriate actions and processing according to computer program instructions stored in read-only memory (ROM) 602 or computer program instructions loaded from storage unit 608 into random access memory (RAM) 603. In RAM 603, various programs and data required for the operation of device 600 may also be stored. CPU 601, ROM 602, and RAM 603 are connected to one another through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as the Internet and/or various telecommunication networks.

Processing unit 601 implements the various methods and processing described above, such as process 300 and/or process 500. For example, in some embodiments, process 300 and/or process 500 may be implemented as a computer software program or a computer program product that is tangibly included in a machine-readable medium, such as a non-transitory computer-readable medium, for example, storage unit 608. In some embodiments, part or all of the computer program may be loaded and/or installed onto device 600 via ROM 602 and/or communication unit 609. When the computer program is loaded into RAM 603 and executed by CPU 601, one or more steps of process 300 and/or process 500 described above may be executed. Alternatively, in other embodiments, CPU 601 may be configured to execute process 300 and/or process 500 in any other suitable manners (for example, by means of firmware).

Those skilled in the art should understand that the steps of the above method of the present disclosure may be implemented by a universal computing apparatus, and may be centralized on a single computing apparatus or distributed over a network composed of a plurality of computing apparatuses. Optionally, they may be implemented using program code executable by a computing apparatus, so that they may be stored in a storage apparatus and executed by a computing apparatus, or they may be made into integrated circuit modules respectively, or they may be implemented by making a plurality of modules or steps thereof into a single integrated circuit module. Thus, the present disclosure is not limited to any particular combination of hardware and software.

It should be understood that although some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. On the contrary, the features and functions of one apparatus described above may be embodied by further dividing the apparatus into a plurality of apparatuses.

The above description is only optional embodiments of the present disclosure, and is not intended to limit the present disclosure. For those skilled in the art, the present disclosure may take on various modifications and alterations. Any modification, equivalent replacement, improvement, and the like made within the spirit and principle of the present disclosure shall be encompassed in the scope of protection of the present disclosure.

The invention claimed is:

1. A resource utilization method, comprising:

determining, at a first node of a storage system, whether a local processing delay of a first accelerator resource of the first node exceeds a first threshold delay;

determining at least one remote processing delay respectively corresponding to at least one second node of the storage system, each remote processing delay of the at least one remote processing delay comprising a processing delay of a second accelerator resource of a corresponding second node of the at least one second node and a round-trip time between the first node and the corresponding second node, in response to determining that the local processing delay exceeds the first threshold delay; and executing a target job of the first node by selecting, at least based on the at least one remote processing delay, a second accelerator resource, from at least one second accelerator resources of the at least one second node.

2. The method according to claim 1, wherein the local processing delay of the first node exceeds the round-trip time.

3. The method according to claim 1, wherein the first node and the at least one second node are connected through a high-speed network interface.

4. The method according to claim 1, the method further comprises:

comparing a priority of a job to be executed at the first node with a threshold priority;

in response to that the priority of the job to be executed is lower than the threshold priority, determining the job to be executed as the target job; and in response to that the priority of the job to be executed exceeds the threshold priority, selecting the first accelerator resource of the first node to execute the job to be executed.

5. The method according to claim 1, wherein the at least one second node comprises a plurality of second nodes, wherein the at least one remote processing delay comprises a plurality of remote processing delays, and wherein the executing the target job of the first node by selecting the second accelerator resource comprises:

comparing the plurality of remote processing delays respectively corresponding to the plurality of second nodes with a second threshold delay;

based on a result of the comparison, determining a remote processing delay that does not exceed the second threshold delay from the plurality of remote processing delays; and executing the target job of the first node by selecting the second accelerator resource of the second node corresponding to the determined remote processing delay.

6. The method according to claim 1, wherein the at least one second node comprises a plurality of second nodes, wherein the at least one remote processing delay comprises a plurality of remote processing delays, and wherein the executing the target job of the first node by selecting the second accelerator resource comprises:

selecting the lowest remote processing delay from the plurality of remote processing delays respectively corresponding to the plurality of second nodes; and executing the target job of the first node by selecting the second accelerator resource of the second node corresponding to the selected remote processing delay.

7. The method according to claim 1, wherein the executing the target job further comprises:

executing the target job by utilizing the selected second accelerator resource through a remote program call interface.

8. The method according to claim 1, wherein the first accelerator resources and the second accelerator resources comprise quick assist technology (QAT) cards.

9. An electronic device, comprising:

a processor; and a memory coupled to the processor, the memory having instructions stored therein, which when executed by the processor, causing the processor to perform actions, the actions comprising:

determining, at a first node of a storage system, whether a local processing delay of a first accelerator resource of the first node exceeds a first threshold delay;

determining at least one remote processing delay respectively corresponding to at least one second node of the storage system, each remote processing delay of the at least one remote processing delay comprising a processing delay of a second accelerator resource of a corresponding second node of the at least one second node and a round-trip time between the first node and the corresponding second node, in response to determining that the local processing delay exceeds the first threshold delay; and executing a target job of the first node by selecting, at least based on the at least one remote processing delay, a second accelerator resource, from at least one second accelerator resources of the at least one second node.

10. The device according to claim 9, wherein the local processing delay of the first node exceeds the round-trip time.

11. The device according to claim 9, wherein the first node and the at least one second node are connected through a high-speed network interface.

12. The device according to claim 9, the actions further comprise:

comparing a priority of a job to be executed at the first node with a threshold priority;

in response to that the priority of the job to be executed is lower than the threshold priority, determining the job to be executed as the target job; and in response to that the priority of the job to be executed exceeds the threshold priority, selecting the first accelerator resource of the first node to execute the job to be executed.

13. The device according to claim 9, wherein the at least one second node comprises a plurality of second nodes, wherein the at least one remote processing delay comprises a plurality of remote processing delays, and wherein the executing the target job of the first node by selecting the second accelerator resource comprises:

comparing the plurality of remote processing delays respectively corresponding to the plurality of second nodes with a second threshold delay;

based on a result of the comparison, determining a remote processing delay that does not exceed the second threshold delay from the plurality of remote processing delays; and executing the target job of the first node by selecting the second accelerator resource of the second node corresponding to the determined remote processing delay.

14. The device according to claim 9, wherein the at least one second node comprises a plurality of second nodes, wherein the at least one remote processing delay comprises a plurality of remote processing delays, and wherein the executing the target job of the first node by selecting the second accelerator resource comprises:

selecting the lowest remote processing delay from the plurality of remote processing delays respectively corresponding to the plurality of second nodes; and executing the target job of the first node by selecting the second accelerator resource of the second node corresponding to the selected remote processing delay.

15. The device according to claim 9, wherein the executing the target job further comprise:

executing the target job by utilizing the selected second accelerator resource through a remote program call interface.

16. The device according to claim 9, wherein the first accelerator resources and the second accelerator resources comprise quick assist technology (QAT) cards.

17. A computer program product, tangibly stored in a computer-readable medium and comprising computer-executable instructions, which when executed by a processor, cause the processor to:

determine, at a first node of a storage system, whether a local processing delay of a first accelerator resource of the first node exceeds a first threshold delay;

determine at least one remote processing delay respectively corresponding to at least one second node of the storage system, wherein each remote processing delay of the of the at least one remote processing delay comprises a processing delay of a second accelerator resource of a corresponding second node of the at least one second node and a round-trip time between the first node and the corresponding second node, in response to determining that the local processing delay exceeds the first threshold delay; and executing a target job of the first node by select, at least based on the at least one remote processing delay, a second accelerator resource, from at least one second accelerator resources of the at least one second node.

18. The computer program product according to claim 17, wherein the local processing delay of the first node exceeds the round-trip time.

19. The computer program product according to claim 17, wherein the first node and the at least one second node are connected through a high-speed network interface.

20. The computer program product according to claim 17, wherein the actions further comprise:

comparing a priority of a job to be executed at the first node with a threshold priority;

in response to that the priority of the job to be executed is lower than the threshold priority, determining the job to be executed as the target job; and in response to that the priority of the job to be executed exceeds the threshold priority, selecting the first accelerator resource of the first node to execute the job to be executed.

* * * * *